United States Patent [19]

Turner

[11] 3,900,763

[45] Aug. 19, 1975

[54] LIGHTING CONTROL DEVICE

[75] Inventor: Charlie B. Turner, Hendersonville, N.C.

[73] Assignee: General Electric Company, N.Y.

[22] Filed: May 9, 1974

[21] Appl. No.: 468,392

[52] U.S. Cl. .......... 315/156; 307/252 B; 307/252 N; 315/159; 315/199; 315/DIG. 7

[51] Int. Cl.$^2$ .......... H05B 37/02

[58] Field of Search .......... 315/156–159, 315/194, 199, DIG. 7; 307/252 B, 252 N

[56] References Cited

UNITED STATES PATENTS

| | | | |
|---|---|---|---|
| 3,403,315 | 9/1968 | Maynard | 307/252 B X |
| 3,708,720 | 1/1973 | Whitney et al. | 307/252 N X |

*Primary Examiner*—James B. Mullins

*Attorney, Agent, or Firm*—Sidney Greenberg

[57] ABSTRACT

Photoelectric control device for switching loads such as street lighting luminaires on and off in response to ambient light levels. The circuit includes a load connected in series with a triac which is triggered by a bilateral semiconductor switch actuated by a resistor and capacitor network, and a photoelectric cell and a thick film switch connected in series across the capacitor so that snap-action switching of the load is provided at threshold light levels.

11 Claims, 2 Drawing Figures

LIGHTING CONTROL DEVICE

The present invention relates to control devices for operating electrical systems such as street lighting equipment in response to ambient light levels.

It is an object of the invention to provide a control device of the above type which is simple in construction, economical to manufacture and reliable in operation.

It is a particular object of the invention to provide a control device of the above type which comprises solid-state components and utilizes a minimum number of components.

Another object of the invention is to provide a control device of the above type which incorporates a photoconductive cell responsive to ambient light levels for turning a load on and off and provides for snap-action switching of the load at threshold light levels.

Other objects and advantages will become apparent from the following description and the appended claims.

With the above objects in view, the present invention in one of its aspects relates to a control device for controlling the operation of a load comprising, in combination, a source of alternating current, load means energized by the alternating current source, controlled switch means connected in series with the alternating current source and the load means and being normally non-conductive to block current flow to the load means and having control electrode means to render it conductive, actuating means connected to the alternating current source and to the control electrode means for applying a control signal to the control electrode means, the actuating means including a resistance and a capacitance connected together in series and voltage sensitive switch means connected to the junction of the resistance and the capacitance and to the control electrode means and being in series discharge relation with the capacitance, and sensor circuit means including sensor means and snap-action symmetrical switch means connected in series across the capacitance, the snap-action symmetrical switch means operating to turn the controlled switch means, and thereby the load means, on and off with rapid switching action at threshold ambient conditions to which the sensor means is responsive.

In a preferred embodiment of the invention, the sensor means comprises a photoelectric cell, the snap-action symmetrical switch means comprises a thick film switch, and the controlled switch means comprises a triac.

Figure 1:
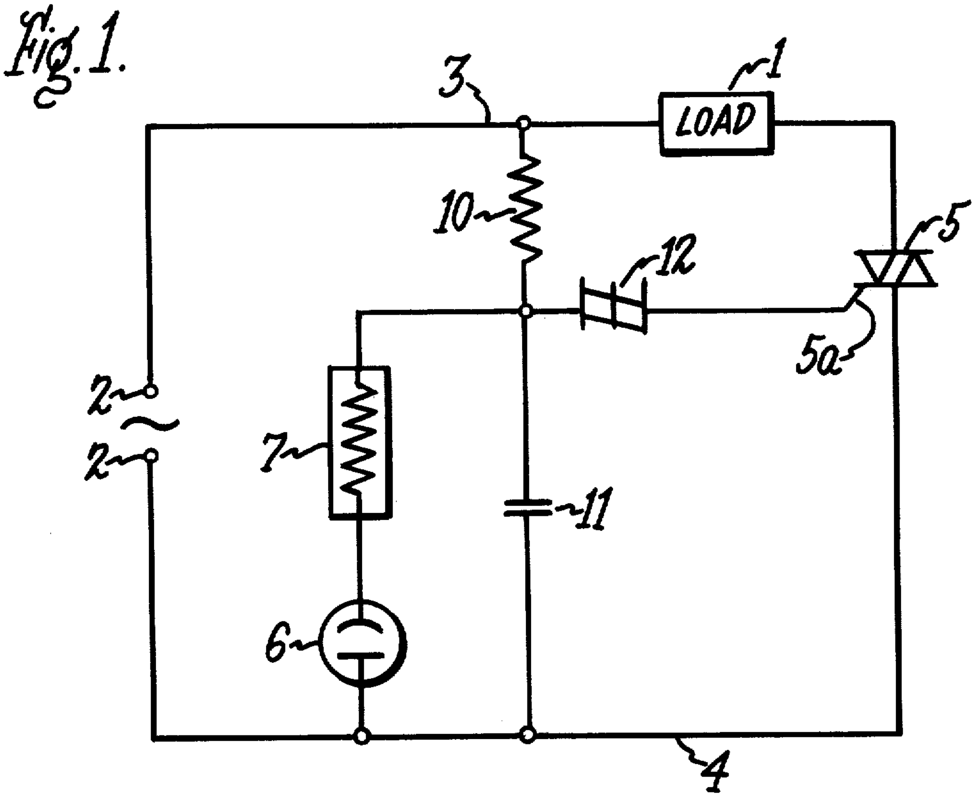
Figure 2:
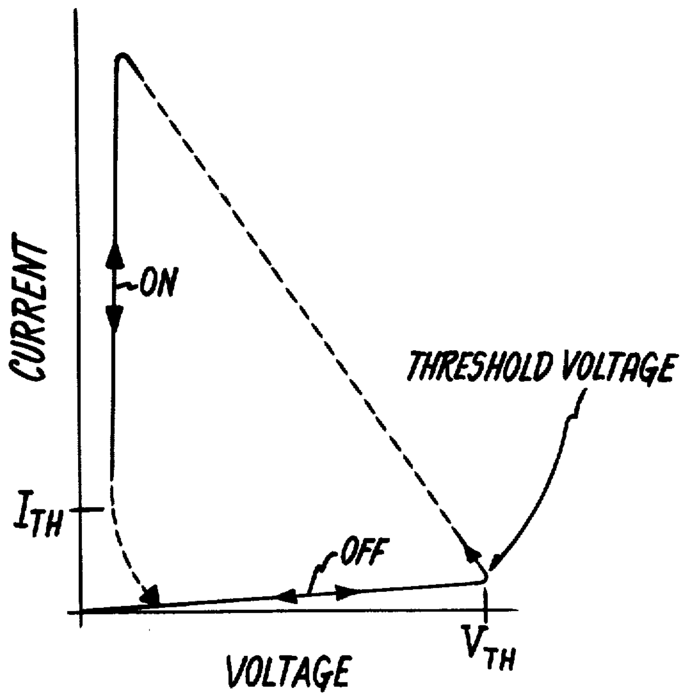

The invention will be better understood from the following description taken in conjunction with the accompanying drawing, in which:

FIG. 1 is a circuit diagram of a preferred embodiment of a control circuit constructed in accordance with the invention; and FIG. 2 is a graph showing the current-voltage characteristics of a thick film switch.

Referring now to the drawing, and particularly to FIG. 1, there is shown a switching circuit for controlling the power applied to a load 1, which may be a gaseous discharge lamp such as a sodium vapor or mercury vapor lamp, or may be of other forms of loads, the load being connected to terminals 2 of a source of alternating current, typically 120 or 240 volts, by supply lines 3 and 4. Arranged in supply line 4 in series with load 1 is a triac 5, which is an alternating current (bilateral) semiconductor controlled switch having a single control electrode 5a which when gated by a signal impulse causes the switch to conduct current as indicated by the forward bias condition of the semiconductor. The triac may also be described as a solid-state bidirectional triode for gate control of alternating current power.

A signal generating or actuating circuit for gating switch 5 comprises series-connected resistance 10, which may be a variable resistance, and charging capacitor 11 connected across terminals 2, thereby synchronizing the signal generating function with the source voltage. A discharge loop in the actuating circuit for discharging capacitor 11 includes a symmetrical (i.e., bilaterally conducting) voltage sensitive switch 12, such as an SBS (silicon bilateral switch) or diac trigger, connected at one side to control electrode 5a and at the other side to the junction of resistor 10 and charge capacitor 11. Switch 12 may also be described as a solid-state bidirectional trigger diode. This device becomes conductive only upon application of a predetermined voltage thereon and is roughly equivalent to a neon glow lamp, but differs therefrom in being a solid-state device and, further, breaks down and operates at lower voltages than the neon glow lamp. As shown, SBS 12 is effectively connected in series discharge relation with capacitor 11 and control electrode 5a and serves therewith to provide a discharge loop when the voltage on capacitor 11 reaches the breakdown level of SBS 12. Thus, when a control signal is applied to electrode 5 a by the actuating circuit on each half cycle, triac 5 is gated through its control electrode 5a so as to conduct in opposite directions on alternate half cycles. The time in the half cycle in which the switch 5 is gated is adjustable by the level of resistance 10. The control of the delay or advance in the time of the alternating current input cycle at which the control signal is applied to render the triac conductive, thereby dictating the load power level, is known as phase controlling.

Connected across capacitor 11 in the illustrated embodiment is photoelectric cell 6, such as a variable resistance cadmium sulfide cell of known type, which is exposed to ambient light rays.

In the operation of the circuit as thus far described, photoelectric cell 6 will have low resistance during daylight hours and prevents the voltage on capacitor 11 from reaching the breakdown level of SBS 12. As a result, triac 5 is non-conductive and lamp 1 is not turned on. When darkness falls, the resistance of photoelectric cell 6 increases and current flows through capacitor 11 until the capacitor voltage increases to the breakover voltage of SBS 12, thereby triggering triac 5 into conduction so as to turn lamp 1 on. However, because the natural illumination of the outdoors changes slowly, the transition of photocell 6 from one resistance state to the other is correspondingly slow. Such a slow change is undesirable since it results in the triac conducting at less than optimum conductor phase angles so that full load power or control is not obtained.

This disadvantage is overcome in accordance with the invention by a provision of a solid-state snap-action switch such as thick film switch 7 in series with photoelectric 6 across capacitor 11. In the operation of the circuit thus provided, when the resistance of photoelectric cell 6 reaches a threshold level, either by an increase or a decrease in ambient light level, thick film switch 7 abruptly changes its resistivity state and effects a snap-on or snap-off of the circuit. This action also provides a latching effect so as to prevent false operation due to changes in natural illumination caused by cloud movements or rain showers at the time of control operation.

Thick film switches are readily available commercially and are sold, for example, under the trademark Tyox by DuPont Company of Wilmington, Del. The nature, properties and functions of thick film switches are disclosed in various places, as, for example, in an article in the periodical Electronic Design, Vol. 20, No. 13, June 22, 1972, pages 26–28, published by Hayden Publishing Co., Inc. 850 Third Ave., New York City, and in a product bulletin of DuPont Co. identified as A-84493 dated 2/73 and entitled "Tyox Thick Film Switch Compositions". Accordingly, the aforesaid disclosures are incorporated herein by reference. Briefly, as disclosed in that literature, the thick film switch sold under the name "Tyox" is based on four oxides of vanadium, and switches between two states of resistivity that differ by up to three orders of magnitude. The switch may be triggered either electronically or by external heat.

When used as a threshold detector, as in the present invention, the switch has a current-voltage characteristic as shown in the graph of FIG. 2. As the applied voltage is increased, the element draws a low level current until it reaches the threshold values of both current $I_{TH}$ and voltage $V_{TH}$. The switch characteristic then passes through a region of negative resistance on its approach to the low resistance, or "on" state. The switch remains on until the applied current is reduced to a value near $I_{TH}$.

The threshold current and voltage are independent functions of element width and length, respectively. Because the length to width ratio of the thick film switch controls its operational point, it can be trimmed or adjusted for optimum performance after all the circuit components employed in accordance with the invention have been assembled.

Since the thick film switch is a symmetrical breakover device, such a switch can also be used in place of SBS 12 when it is designed for the proper breakover level.

Although a thick film switch is particularly preferred for use in association with photoelectric cell 6 as shown to obtain snap-action switching effects, other types of snap-action switches such as a diac or an SBS may alternatively be used in appropriate situations.

It will also be understood that while the invention has been described in connection with the use of a photoelectric cell for response to ambient light levels, the invention is also applicable to circuits utilizing other form of variable resistance sensor devices, e.g., moisture sensing device, atmospheric pressure device, thermistor, or other ambient condition detecting devices, as appropriate for the particular application.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A control device for controlling the operation of a load comprising, in combination, a source of alternating current, load means energized by said alternating current source, controlled switch means connected in series with said alternating current source and said load means and being normally non-conductive to block current flow to said load means and having control electrode means to render it conductive, actuating means connected to said alternating current source and to said control electrode means for applying a control signal to said control electrode means, said actuating means including a resistance and a capacitance connected together in series and voltage sensitive symmetrical switch means connected to the junction of said resistance and capacitance and to said control electrode means being in series discharge relation with said capacitance, and sensor circuit means including sensor means and snap-action symmetrical switch means connected in series across said capacitance, said snap-action symmetrical switch means operating to turn said controlled switch means, and thereby said load means, on and off with rapid switching action at threshold ambient conditions to which said sensor means is responsive.

2. A device as defined in claim 1, said sensor means comprising a variable resistance photoconductive means operating in response to ambient light levels.

3. A device as defined in claim 2, said photoconductive means comprising a cadmium sulfide photoelectric cell.

4. A device as defined in claim 1, said snap-action symmetrical switch means comprising a thick film switch.

5. A device as defined in claim 2, said snap-action symmetrical switch means comprising a thick film switch.

6. A device as defined in claim 5, said controlled switch means comprising a solid-state bidirectional triode, said voltage sensitive switch means comprising a solid-state bidirectional trigger diode.

7. A device as defined in claim 6, said controlled switch means comprising a triac.

8. A device as defined in claim 7, said voltage sensitive switch means comprising a silicon bilateral switch.

9. A device as defined in claim 7, said voltage sensitive switch means comprising a diac.

10. A device as defined in claim 7, said voltage sensitive switch means comprising a thick film switch.

11. A device as defined in claim 1, said load means comprising a light source.

* * * * *

UNITED STATES PATENT OFFICE

CERTIFICATE OF CORRECTION

PATENT NO. : 3,900,763

DATED : August 19, 1975

INVENTOR(S) : C. B. Turner

It is certified that error appears in the above-identified patent and that said Letters Patent are hereby corrected as shown below:

Col. 4, line 24 - after "means" insert - and -

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*